UNITED STATES PATENT OFFICE.

ISAAC M. SCOTT, OF WHEELING, WEST VIRGINIA.

PROCESS OF REMOVING SCALE FROM IRON PLATE.

1,359,281. Specification of Letters Patent. Patented Nov. 16, 1920.

No Drawing. Application filed April 23, 1920. Serial No. 376,091.

*To all whom it may concern:*

Be it known that I, ISAAC M. SCOTT, a citizen of the United States, residing at Wheeling, in the county of Ohio and State of West Virginia, have invented certain new and useful Improvements in Processes of Removing Scale from Iron Plate; and I do hereby declare the following to be a full, clear, and exact description of the invention, such as will enable others skilled in the art to which it appertains to make and use the same.

This invention relates to a method of removing scale from iron plates after the rolling process and has for its object to improve the processes heretofore proposed.

With this and other objects in view the invention consists in the novel steps and combinations of steps constituting the process all as will be more fully hereinafter disclosed and particularly pointed out in the claims.

In carrying out this invention, I take the iron or steel plates after the process of rolling and cutting into lengths has been completed and without any pickling or acid treatment and I embed said plates in powdered ferro silicon. The embedded plates and ferro silicon are next heated to a temperature between say 700° C. and 1000° C., whereupon the silicon of the ferro-silicon is found to deoxidize the scale or $Fe_3O_4$, or other oxids, present on the surfaces of the plates, and thus to clean the same.

The heating of the plates and ferro silicon is continued for a period of from 18 to 24 hours or longer, according to the character of the scale to be removed, and the plates are then allowed to cool gradually so as to anneal the same.

The temperatures and periods of annealing will be controlled in the well known manner by the operator according to the results he wishes to produce in the finished article.

It will thus be seen that by subjecting the scale, or oxid of the plates to the action of ferro-silicon, I am enabled to reduce the black oxid in accordance with the following equation:—

$$Fe_2O_4 + 2Si = 3Fe + 2SiO_2$$

In the case of the red oxid the reaction would be expressed as follows:—

$$2Fe_2O_3 + 3Si = 4Fe + 3SiO_2$$

In all cases I thus avoid all cleaning or pickling of said plates. I am also enabled to anneal the plates in the same operation, and this effects a considerable saving in the costs of manufacture. Of course, the reducing operation as well as the annealing should be carried out in a reducing or in a neutral atmosphere.

What I claim is:—

1. The process of removing scale from metal plates which consists in heating said plates in contact with powdered ferro-silicon for a time and at a temperature sufficient to reduce said scale, substantially as described.

2. The process of removing scale from and annealing metal plates, which consists in embedding said plates in powdered ferro-silicon; maintaining the said plates and ferro-silicon at a temperature, and for a time, sufficient to reduce said scale; and so controlling the rate of cooling of said heated plates as to anneal the same, substantially as described.

In testimony whereof I affix my signature.

ISAAC M. SCOTT.